(12) United States Patent
Yamamoto

(10) Patent No.: US 8,542,818 B2
(45) Date of Patent: Sep. 24, 2013

(54) VEHICLE CALL DEVICE, CALL SYSTEM, CENTER, AND CALLING METHOD

(75) Inventor: Shinichi Yamamoto, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1322 days.

(21) Appl. No.: 12/252,130

(22) Filed: Oct. 15, 2008

(65) Prior Publication Data

US 2009/0110185 A1     Apr. 30, 2009

(30) Foreign Application Priority Data

Oct. 26, 2007    (JP) .................................. 2007-278834

(51) Int. Cl.
*H04M 9/08*       (2006.01)

(52) U.S. Cl.
USPC ................ 379/406.01; 455/404.1; 340/425.5; 340/989

(58) Field of Classification Search
USPC ....... 455/404.1; 340/989, 425.5; 379/406.01
See application file for complete search history.

(56) References Cited

U.S. PATENT DOCUMENTS

| 6,337,641 B1 * | 1/2002 | Yoshioka et al. ............. 340/989 |
| 7,969,821 B2 * | 6/2011 | Yonak ........................... 367/129 |
| 2005/0153680 A1 * | 7/2005 | Yoshioka et al. .......... 455/404.1 |
| 2007/0152803 A1 * | 7/2007 | Huang et al. ................. 340/435 |

FOREIGN PATENT DOCUMENTS

| JP | 2000216916 A * | 8/2000 |
| JP | 2002-127858 A | 5/2002 |
| JP | 2002-288772 A | 10/2002 |

* cited by examiner

*Primary Examiner* — Gerald Gauthier
*Assistant Examiner* — Simon King
(74) *Attorney, Agent, or Firm* — Kenyon & Kenyon LLP

(57) ABSTRACT

A vehicle call device, a call system, a center, and a calling method capable of detecting a problem while controlling the cost increase are disclosed. The vehicle call device includes a speaker mounted in a vehicle, the speaker outputting a received voice of an opposite communication party; a microphone mounted in the vehicle; an echo canceller unit removing the received voice that has been output from the speaker and input into the microphone; a detecting unit detecting an emergency situation of the vehicle; and a remove preventing unit preventing the eco canceller unit from removing the received voice when the detecting unit detects the emergency situation.

7 Claims, 7 Drawing Sheets

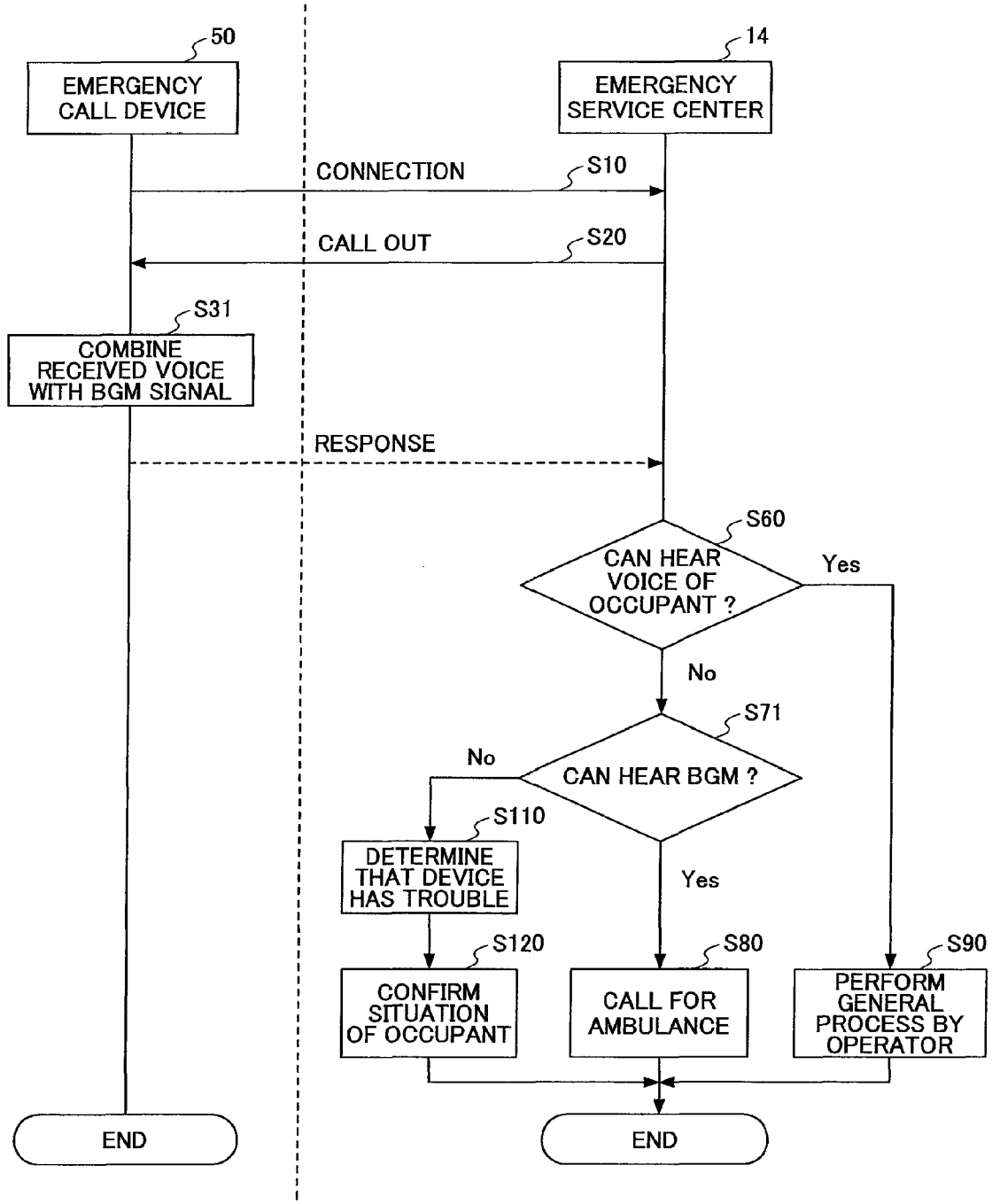

VEHICLE CALL DEVICE, CALL SYSTEM, CENTER, AND CALLING METHOD

CROSS-REFERENCE TO RELATED APPLICATIONS

The present application claims priority under 35 U.S.C §119 to Japanese Patent Application Publication No. 2007-278834 filed Oct. 26, 2007, the entire contents of which are hereby incorporated herein by reference.

BACKGROUND OF THE INVENTION

1. Field of the Invention

The present invention generally relates to a vehicle call device and the like, and more particularly to a vehicle call device, a call system, a center, and a calling method capable of detecting a problem of the vehicle call device in emergency situations.

2. Description of the Related Art

Recently, an emergency call system has been mounted in vehicles, the system being capable of providing hands-free communications with an emergency service center (hereinafter may be referred to as a "center"), the police, a fire station, and the like for reporting a problem with the vehicle and calling for help. However, such an emergency call system may break down in an emergency situation when, for example, the vehicle is involved in an accident. Further, such an emergency situation may not come by so often, therefore a back-up battery may be almost discharged. As a result, a function of the emergency call system may not operate as expected in such an emergency situation. For example, when such an emergency call system is provided in a vehicle, an occupant of the vehicle and an operator of a center may talk with each other. However, when, for example, the microphone of the vehicle has a problem, the occupant becomes unable to talk with the operator.

On the other hand, the occupant may also be unable to talk to the operator even when the emergency call system works properly because the occupant is injured. Because of this possibility, when the operator of the center requests the occupant of the vehicle to respond to the operator's call through the emergency call system and no response from the occupant is detected, the operator may not be able to determine the reason for the not-detected response such as whether the microphone of the emergency call system has a problem or the occupant of the vehicle is unable to respond to the operator because of his/her injury.

To overcome the problem, there has been provided a vehicle emergency call system capable of detecting whether the speaker or the microphone in a vehicle is broken by playing a fixed voice message in the vehicle, collecting the played voice message using the microphone, and determining whether the collected fixed voice message corresponds to the played fixed voice message (see, for example, Japanese Patent Application Publication Nos. 2002-288772 and 2002-127858).

However, when the above method is employed where a problem is detected by determining whether the voice signal from the speaker corresponds to the voice signal collected by the microphone, there may arise a problem that when the voice or the noise level in the vicinity of the vehicle is high, the voice or the noise may be colleted by the microphone, which may result in its being determined that the emergency call system has a problem even though the emergency call system does not have any problem. Further, it may require a certain period of time to perform this type of decision process. Therefore, preferably, this type of decision process should not be performed in any emergency situation where there is no time to waste. Further, when this type of decision process is performed even in a situation other than an emergency situation, the occupant of the vehicle may feel uncomfortable because conversation between the occupants in the vehicle and playing an audio device are not allowed during the period of making the decision. Further, disadvantageously, it is necessary to mount additional elements the elements being for handling the fixed voice message and comparing the fixed voice messages onto the vehicle, thereby increasing the cost.

SUMMARY OF THE INVENTION

The present invention is made in light of these circumstances and may provide a vehicle call device, a call system, a center, and a calling method capable of detecting a problem with the vehicle call device while controlling the cost increase of the vehicle call device.

According to an aspect of the preset invention, a vehicle call device includes a speaker mounted in a vehicle, the speaker outputting a received voice of an opposite communication party; a microphone mounted in the vehicle; an echo canceller unit removing the received voice that has been output from the speaker and input into the microphone; a detecting unit detecting an emergency situation of the vehicle; and a remove preventing unit preventing the eco canceller unit from removing the received voice when the detecting unit detects the emergency situation.

With this configuration, by turning OFF the echo cancelling function of the echo canceller section, it becomes possible for the opposite communication party to easily determine whether the device mounted in the vehicle has a problem. Further, the element serving as the echo canceller unit is generally mounted in vehicles as standard equipment. Therefore, the cost increase may be minimized.

Further, the vehicle call device may further include a receiving unit receiving a preventing signal for preventing the removal of the received voice so that the remove preventing unit can prevent the eco canceller unit from removing the received voice when the receiving unit receives the preventing signal.

By doing this, for example, the opposite communication party may transmit the preventing signal. Therefore, it becomes possible to turn OFF the echo cancelling function of the echo canceller section based on the will of the opposite communication party and to determine whether the device mounted on the vehicle has a problem.

According to another aspect of the preset invention, the vehicle call device further includes a voice level detecting unit detecting a voice level collected by the microphone so that, when a voice level detected by the voice level detection unit is less than a prescribed value, the remove preventing unit prevents the eco canceller unit from removing the received voice.

By doing this, it becomes possible to automatically detect that the occupant of the vehicle is unable to respond by monitoring the voice signal level and to turn OFF the echo cancelling function of the echo canceller section. As a result, it becomes possible to determine whether the device mounted on the vehicle has a problem even when the opposite communication party does not do anything.

According to still another aspect of the preset invention, the vehicle call device includes a speaker mounted in a vehicle, the speaker outputting a received voice of an opposite communication party; a microphone mounted in the vehicle; an echo canceller unit removing the received voice that has been output from the speaker and input into the microphone; a detecting unit detecting an emergency situation of the vehicle; and a sound outputting unit outputting a prescribed sound when the detecting unit detects the emergency situation.

By doing this, it becomes possible to determine whether the device mounted on the vehicle has a problem based on whether the opposite communication party can hear the sound like a BGM. Further, the echo cancelling function of the echo canceller section is not turned OFF. Therefore, when the occupant of the vehicle responds, the voice of the occupant of the vehicle may be easily heard.

According to an embodiment of the present invention, a vehicle call device, a call system, a center, and a calling method capable of detecting a problem of the vehicle call device may be provided while controlling the cost increase of the vehicle call device.

BRIEF DESCRIPTION OF DRAWINGS

Other objects, features, and advantages of the present invention will become more apparent from the following description when read in conjunction with the accompanying drawings, in which:

FIG. 7 is a schematic sequence diagram showing a procedure by which the center determines whether the emergency call device in communication with the center has a problem according to the third embodiment of the present invention.

DETAILED DESCRIPTION OF THE PREFERRED EMBODIMENT

Exemplary embodiments of the present invention are described below with reference to the accompanying drawings.

Embodiment 1

In this embodiment, an emergency call system 100 turns OFF an echo canceller in an emergency call device 50 mounted in a vehicle so that an operator of an emergency service center (hereinafter may be referred to as just a "center") can determine whether the emergency call device 50 has a problem or an occupant of the vehicle is unable to respond to the operator's call because of the injury.

Figure 1:
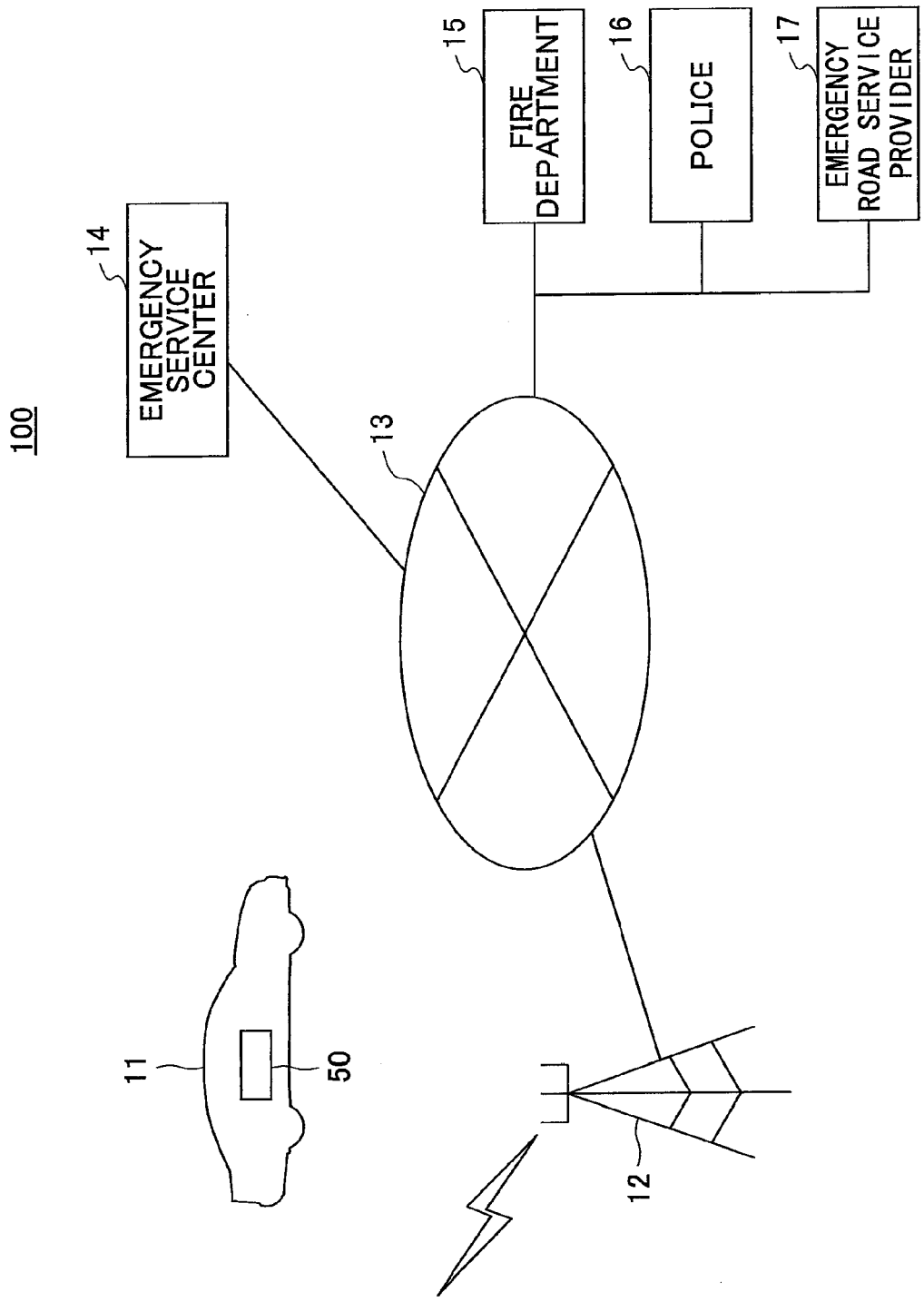
FIG. 1 is a schematic drawing showing an exemplary configuration of an emergency call system.

FIG. 1 schematically shows an exemplary configuration of the emergency call system 100. As shown in FIG. 1, the emergency call system 100 generally includes a vehicle 11, a base station 12, and a network 13 forming a cell phone network or a public telephone line network, and an emergency service center (or simplified as a "center") 14. In an emergency situation, the vehicle 11 and the center 14 start communications with each other through the base station 12 and the network 13, so that an occupant of the vehicle 11 and an operator of the center 14 can talk with each other. Further, when it becomes necessary, the operator of the center 14 makes contact with the fire department 15, the police 16, or an emergency road service provider 17 (herein after referred to as the "fire department and the like") to ask then to immediately go to the site of the vehicle 11. It should be noted that a voice recognition system may be used in the center 14 so that the center 14 can recognize the voice of the occupant of the vehicle 11 and determine whether the emergency call device 50 has a problem. However, in the embodiments, it is assumed that the operator of the center 14 is in communication with the occupant of the vehicle 11 and the fire department and the like.

Figure 2:
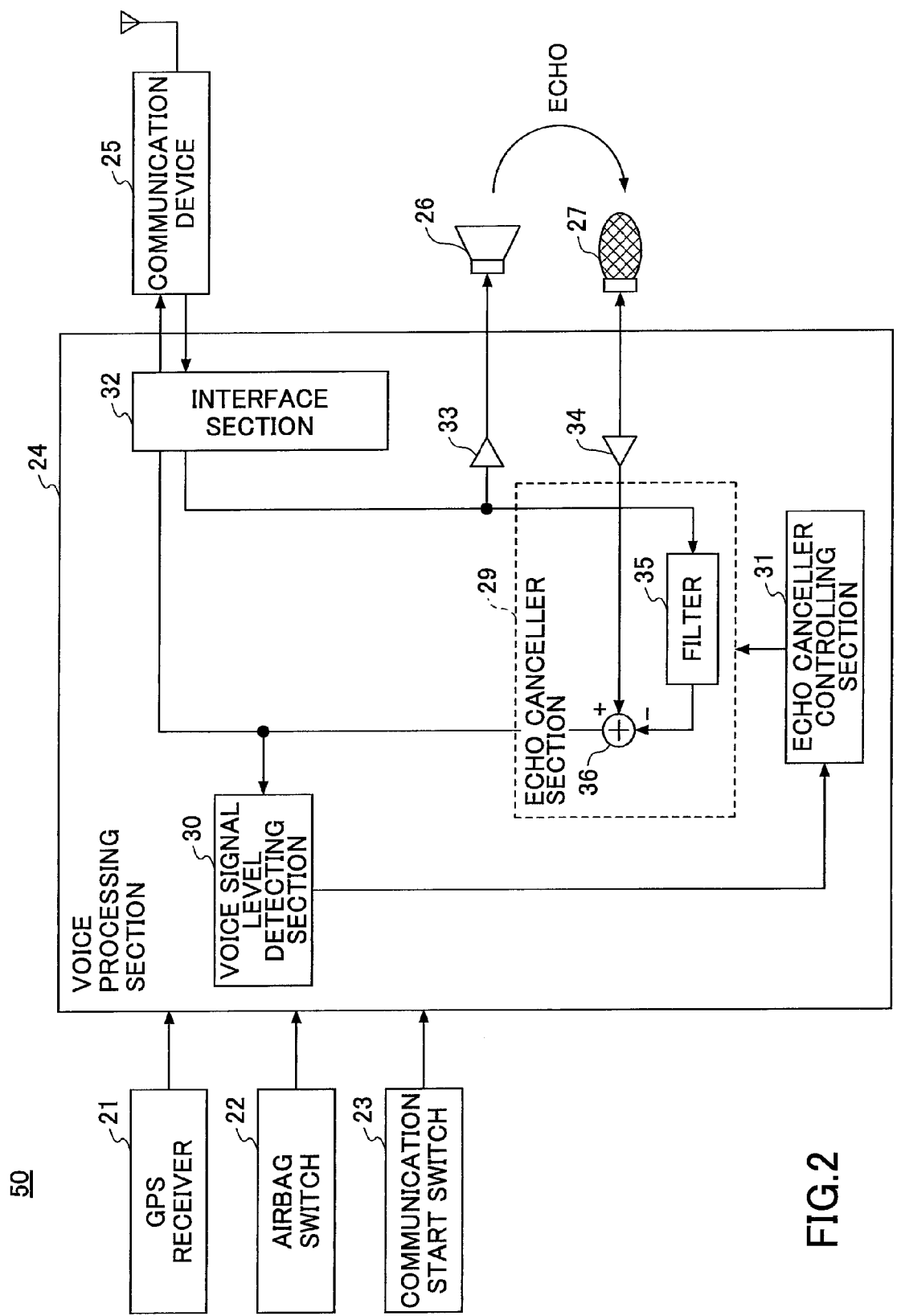
FIG. 2 is a block diagram showing an exemplary configuration of the emergency call device according to a first embodiment of the present invention.

FIG. 2 is a block diagram showing an exemplary configuration of the emergency call device 50 according to a first embodiment of the present invention. As shown in FIG. 2, the emergency call device 50 includes a voice processing section 24 which controls the emergency call device 50. The emergency call device 50 further includes a GPS (Global Positioning System) receiver 21, an airbag switch 22, a communication start switch 23, a communication device 25, a speaker 26, and a microphone 27, each being connected to the voice processing section 24. The GPS receiver 21 receives radio waves from GPS satellites for calculating the position of the vehicle 11. The airbag switch 22 detects an operation of the airbags housed in the driver's seat, a front passenger's seat, and the like. The communication start switch 23 is turned ON by an occupant of the vehicle 11 to start communications with the center 14. The communication device 25 is used to communicate with the center 14. The speaker 26 outputs voice sounds, and the microphone 27 converts the voice sound into an electrical signal.

The voice processing section 24 is configured as a computer system that includes a CPU, a ROM, a RAM, and input/output interfaces, and includes an echo canceller controlling section 31 realized by executing a program by the CPU. The voice processing section 24 further includes an interface section 32, an echo canceller section 29, and a voice signal level detecting section 30. The interface section 32 inputs and outputs a received voice signal and a transmitted voice signal. The echo canceller section 29 cancels an echo. The voice signal level detecting section 30 detects a voice signal level of the transmitted voice signal.

The communication device 25 may be a data communication unit having a voice communication function or may be a cell phone of the occupant of the vehicle 11. When the communication device 25 performs data communications, the communication device 25 establishes a data link connection in accordance with the PPP (Point-To-Point) protocol or the like and can transmit and receive data through the network 13, using an upper layer protocol such as TCP/IP (Transmission Control Protocol/Internet Protocol). Through the communication device 25, the positional information of the vehicle 11 and the like may be transmitted to the center 14.

The interface section 32 establishes a connection with the communication device 25 based on a wired connection removably attached to the communication device 25 or a wireless connection with the communication device 25 so that the interface section 32 receives the received voice signal transmitted from the communication device 25 and transmits the transmitted voice signal to the communication device 25, the transmitted voice signal being generated by the voice processing section 24. In the wireless communications, the Bluetooth (registered trademark) communication standards may be used for receiving the received voice signals and transmitting the transmitted voice signals.

Further, the interface section 32 is equipped with an input device such as a switch so that a user can operate the input device to transmit an On-hook/Off-hook instruction to the communication device 25 for the communication device 25 to perform an On-hook/Off-hook operation.

Further, in an emergency situation, when the airbag switch 22 detects an operation of the airbag, or when the communication start switch 23 is turned ON, the interface section 32 sets a telephone number previously registered as the destination telephone number to be in communication with the center 14. In addition, an emergency situation may be detected by using an acceleration sensor or the like.

The communication device 25 transmits the received voice signal to the interface section 32, the received voice signal being received from the operator through the network 13. Further, the communication device 25 transmits the transmitted voice signal to the operator through the network 13, the transmitted voice signal being received from the interface section 32.

The voice processing section 24 further includes a received voice amplifier 33 and a transmitted voice amplifier 34. The received voice amplifier 33 amplifies the received voice signal transmitted from the interface section 32 and drives the speaker 26 to output the received voice in the vehicle 11. As the speaker 26, a speaker for an audio system or a navigation system mounted in the vehicle 11 may be used. Preferably, for example, the speaker 26 is disposed in the driver's door and directed inward.

The transmitted voice amplifier 34 transmits a voice sound in the vehicle 11 collected by the microphone 27 to the echo canceller section 29 as the transmitted voice signal. The echo canceller section 29 cancels an echo component of the received voice included in the transmitted voice signal, and transmits the signal after the cancellation to the communication device 25 through the interface section 32. The microphone 27 may be installed in the middle part of a handle, an instrument panel, the A-pillar on the driver's side, or the like, and has directional characteristics so as to collect a driver's voice with higher sensitivity.

The echo canceller section 29 includes a filter 35 and a mixer 36. The filter 35 calculates a pseudo echo signal. The pseudo echo signal may be generated using a known technique in which, for example, the phase of the received voice signal is inverted by 180 degrees and the inverted signal is modified in accordance with the expected changes based on the ambient acoustic characteristics of the vehicle 11. The mixer 36 subtracts the pseudo echo signal calculated by the filter 35 from the transmitted voice signal from the transmitted voice amplifier 34, and transmits the output of the mixer 36 to the interface section 32.

The echo canceller controlling section 31 can turn OFF an echo cancelling function of the echo canceller section 29. Usually, the echo canceller section 29 is turned ON so that the echo cancelling function is activated. Therefore, when the echo canceller section 29 is turned OFF, the operator of the center 14 will be able to hear his/her own voice with little delay because the voice of the operator output from the speaker 26 is directly input into the microphone 27 and returned to the center 14 without being echo-cancelled by the mixer 36.

In the emergency call device 50 in FIG. 2, an operator of the center 14 may easily determine whether the emergency call device 50 has a problem or the occupant of the vehicle 11 is unable to talk to the operator due to his/her injury. This is because when the operator of the center 14 can hear his/her echo-back voice but cannot hear any voice of the occupant of the vehicle 11, the operator can easily notice that the occupant of the vehicle 11 is unable to talk to the operator due to the injury. On the other hand, when the operator cannot hear his/her own echo-back voice, it may be obvious that the emergency call device 50 has a problem. However, it is still uncertain whether the occupant of the vehicle 11 is in an emergency situation such as being injured in that the occupant has not responded to the operator. Therefore, another method (such as taking a picture inside the vehicle 11 and taking the occupant's pulse) should be used. Further, the echo canceller section 29 is usually included as standard equipment in the environment where a hands-free call can be performed and in cell phones. Therefore, it becomes possible to determine whether the emergency call device 50 has a problem with minimum additional functions.

In this embodiment, the emergency call device 50 capable of automatically turning OFF the echo cancelling function of the echo canceller section 29 is described. In the initial setting, the echo cancelling function of the echo canceller section 29 is turned ON (activated). Therefore, when the occupant of the vehicle 11 is able to talk to the operator, it is preferable to keep the echo cancelling function of the echo canceller section 29 turned ON because the operator can hear what the occupant says more clearly. However, when the occupant of the vehicle 11 is unable to talk to the operator, it is preferable that the emergency call device 50 be able to automatically turn OFF (deactivate) the echo cancelling function of the echo canceller section 29.

For example, when the occupant of the vehicle 11 is unable to talk to the operator, the voice signal level should become lower than a prescribed signal level. In this embodiment, therefore, the echo canceller controlling section 31 turns OFF the echo cancelling function of the echo canceller section 29 based on the voice signal level of the transmitted voice signal.

Figure 3:
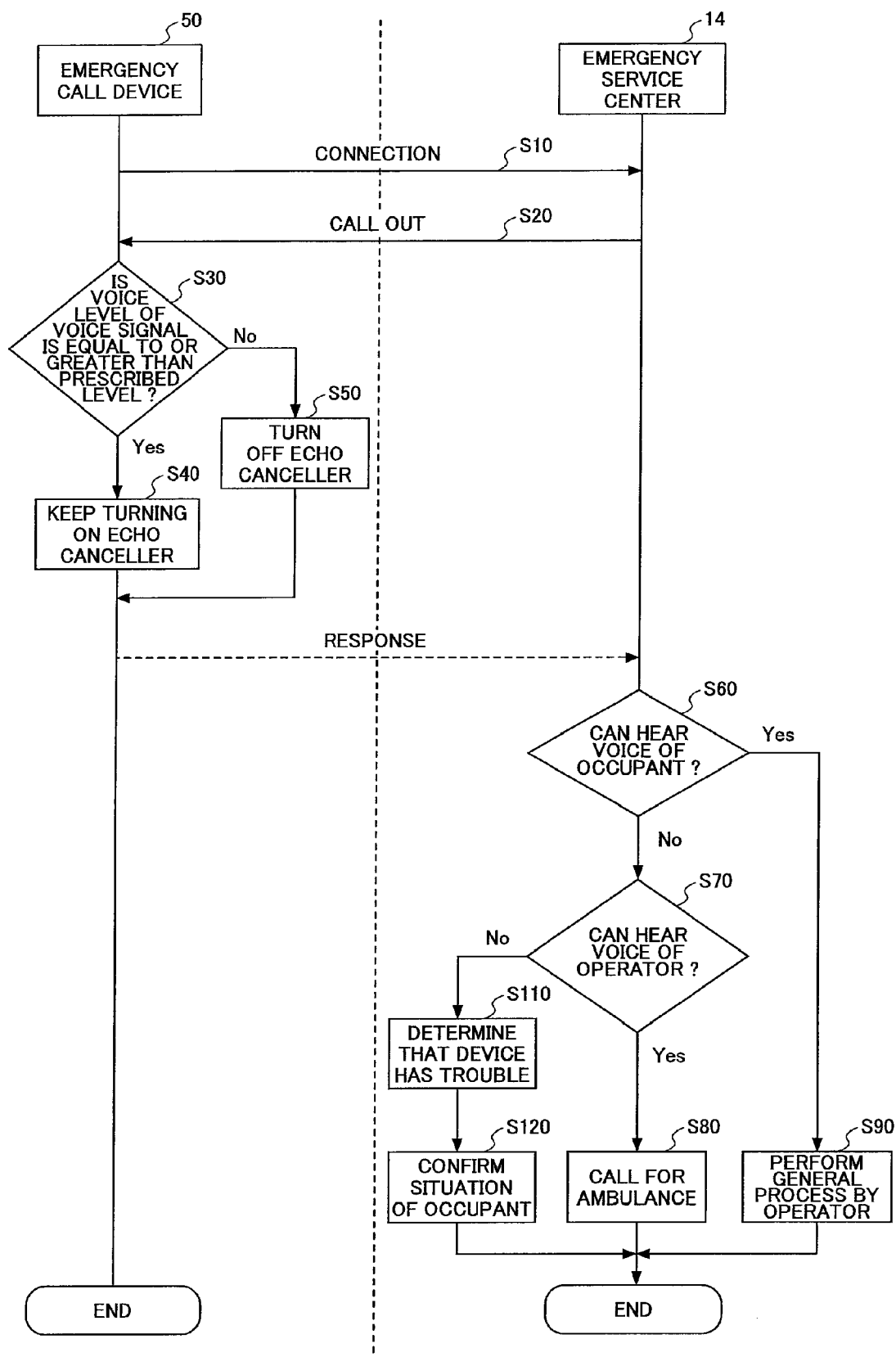
FIG. 3 is a schematic sequence diagram showing a procedure by which an emergency service center (herein after simplified as a "center") determines whether the emergency call device in communication with the center has a problem according to the first embodiment of the present invention.

FIG. 3 is a schematic sequence diagram showing a procedure by which the operator of the center 14 determines whether the emergency call device 50 in communication with the center 14 has a problem. In the procedure shown in FIG. 3, the emergency call device 50 of the vehicle 11 starts the communications with the emergency service center (center) 14 when the airbag switch 22 detects an operation of the airbag or when the communication start switch 23 is turned ON (step S10). The operator of the center 14 responds to the connection from the vehicle 11 and calls out to an occupant of the vehicle 11 (step S20).

After the connection with the center 14 is established, the voice signal level detecting section 30 determines whether the voice signal level of the transmitted voice signal is equal to or greater than a prescribed signal level. In this case, the transmitted voice signal includes an echo component of the received voice from the operator. Therefore, the voice signal level detecting section 30 detects the voice signal level of the transmitted voice signal that is transmitted from the mixer 36 where the pseudo echo signal is subtracted from the transmitted voice signal from the transmitted voice amplifier 34, and then determines whether the voice signal level of the transmitted voice signal is equal to or greater than a prescribed signal level (step S30). It should be noted that the voice signal level may be monitored by detecting the voltage value of the voice signal level.

When it is determined that the voice signal level of the transmitted voice signal is equal to or greater than a prescribed signal level (YES in step S30), it is assumed that the occupant of the vehicle 11 is responding to the operator of the center 14. Therefore, the echo canceller controlling section 31 keeps the echo cancelling function of the echo canceller section 29 turned ON (step S40). On the other hand, when it is determined that the voice signal level of the transmitted voice signal is less than a prescribed signal level (NO in step S30), the echo canceller controlling section 31 turns OFF the echo cancelling function of the echo canceller section 29 (step S50).

The operator of the center 14 may repeatedly call out to the occupant of the vehicle 11 as long as necessary to determine whether a voice of the occupant of the vehicle 11 can be heard (step S60). When it is determined that the occupant of the vehicle 11 responds to the operator of the center 14 and the voice of the occupant of the vehicle 11 can be heard (YES in step S60), the operator of the center 14 performs a general process of calling for an ambulance and the like in accordance with the information of the damage level of the vehicle 11 and/or the injury level of the occupant of the vehicle 11 heard from the occupant of the vehicle 11 (step S90).

On the other hand, when it is determined that the occupant of the vehicle 11 does not respond to the operator of the center 14 and the voice of the occupant of the vehicle 11 cannot be heard (NO in step S60), the echo cancelling function of the echo canceller section 29 is turned OFF (deactivated) because the voice signal level of the transmitted voice signal is less than the prescribed signal level. Therefore, if the microphone 27 of the emergency call device 50 does not have a problem, the voice of the operator of the center 14 included in the transmitted voice signal is returned to the center 14.

The operator of the center 14 determines whether his/her own returned voice can be heard (step S70). When it is determined that the his/her own returned voice can be heard (YES in step S70), it is assumed that the occupant of the vehicle 11 is injured because of no response from the occupant of the vehicle 11 even in the situation where neither the speaker 26 nor the microphone 27 has a problem, and the operator of the center 14 may call for an ambulance (step S80).

On the other hand, when it is determined that the his/her own returned voice cannot be heard (NO in step S70), it is assumed that at least either the speaker 26 or the microphone 27 has a problem (step S110). Therefore, a method other than the method of communicating with the occupant of the vehicle 11 is to be used for confirming the situation of the occupant of the vehicle 11 (step S120). It should be noted that when the echo canceller controlling section 31 turns OFF the echo cancelling function of the echo canceller section 29, the information item indicating that the echo canceller section 29 is being turned OFF may be transmitted to the center 14.

According to this embodiment of the present invention, by turning OFF the echo cancelling function of the echo canceller section 29, it becomes possible to determine whether the emergency call device 50 has a problem. Further, the element serving as the echo canceller section 29 is generally included in a vehicle as standard equipment, and monitoring the voice signal level of the transmitted voice signal can be easily performed. Therefore, it is possible to determine whether the emergency call device 50 has a problem with minimum additional cost.

Embodiment 2

In this embodiment, the emergency call system 100 in which the echo canceller controlling section 31 can turn OFF the echo cancelling function of the echo canceller section 29 based on a signal from the center 14 is described. For example, when the occupant of the vehicle 11 is unable to talk due to his/her injury, it is possible to assume that the occupant of the vehicle 11 is unable to respond to an operator's call. However, when the echo cancelling function of the echo canceller section 29 is automatically turned OFF as described in the first embodiment, the operator of the center 14 may have to wait for a certain period of time until the echo cancelling function of the echo canceller section 29 is turned OFF, which may cause a delay in determining whether, for example, the emergency call device 50 has a problem. In addition, in a case of the first embodiment, when the level of the noise generated from the vehicle 11 or the ambient noise is greater than the prescribed level, the echo cancelling function of the echo canceller section 29 is not turned OFF.

Further, when it is possible for the operator of the center 14 to remotely turn OFF the echo cancelling function of the echo canceller section 29 of the emergency call device 50, the operator of the center 14 is able to grasp when the echo cancelling function of the echo canceller section 29 is turned OFF. As a result, the operator of the center 14 may determine whether the emergency call device 50 has a problem more easily compared with the case where the operator of the center 14 has to wait until the echo cancelling function of the echo canceller section 29 is automatically turned OFF.

Figure 4:
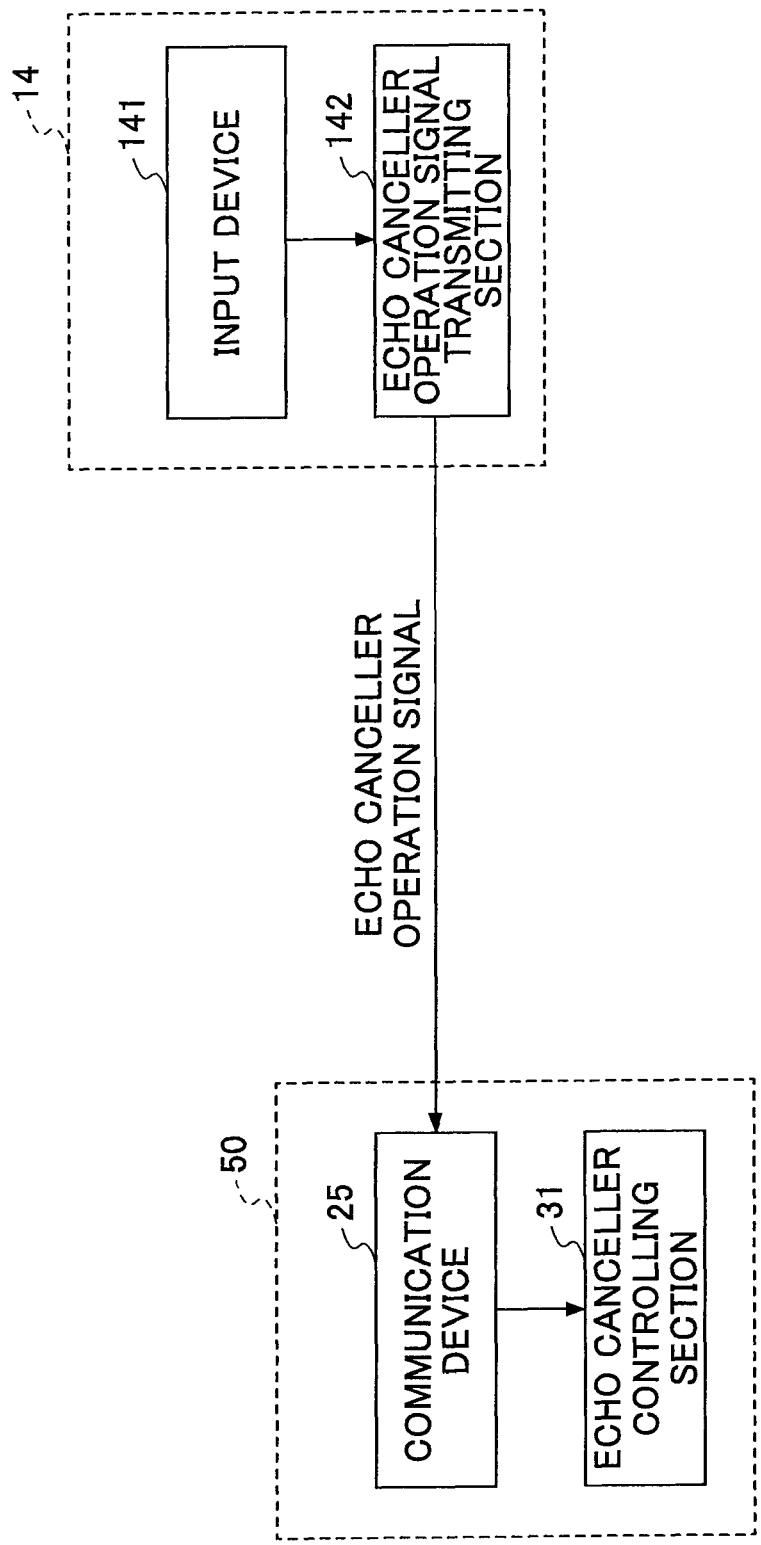
FIG. 4 is a block diagram showing an exemplary configuration of the emergency call system according to a second embodiment of the present invention.

FIG. 4 is a block diagram showing an exemplary configuration of the emergency call system 100 according to a second embodiment of the present invention. It should be noted that the same reference numerals are used in FIG. 4 for denoting the same elements in FIG. 2, and the descriptions of the same elements are omitted. As shown in FIG. 4, the emergency service center ("center") 14 includes an input device 141 and an echo canceller operation signal transmitting section 142. The input device 141 may be a mouse, a keyboard, or the like for operating a computer of the center 14, and the operator of the center 14 uses the input device 141 to operate application software executed by the computer. When operating the computer of the center 14 to transmit an echo canceller operation signal to the vehicle 11, the operator of the center 14 uses a prescribed operations menu of the application software so that the echo canceller operation signal transmitting section 142 transmits the echo canceller operation signal to the vehicle 11 to turn OFF the echo cancelling function of the echo canceller section 29. In this case, more specifically, the echo canceller operation signal transmitting section 142 transmits the echo canceller operation signal to the communication device 25 specified by the telephone number or the like using an NIC (Network Interface Card) or the like. The echo canceller controlling section 31 in the emergency call device 50 turns OFF the echo cancelling function of the echo canceller section 29 based on the echo canceller operation signal received by the communication device 25.

Figure 5:
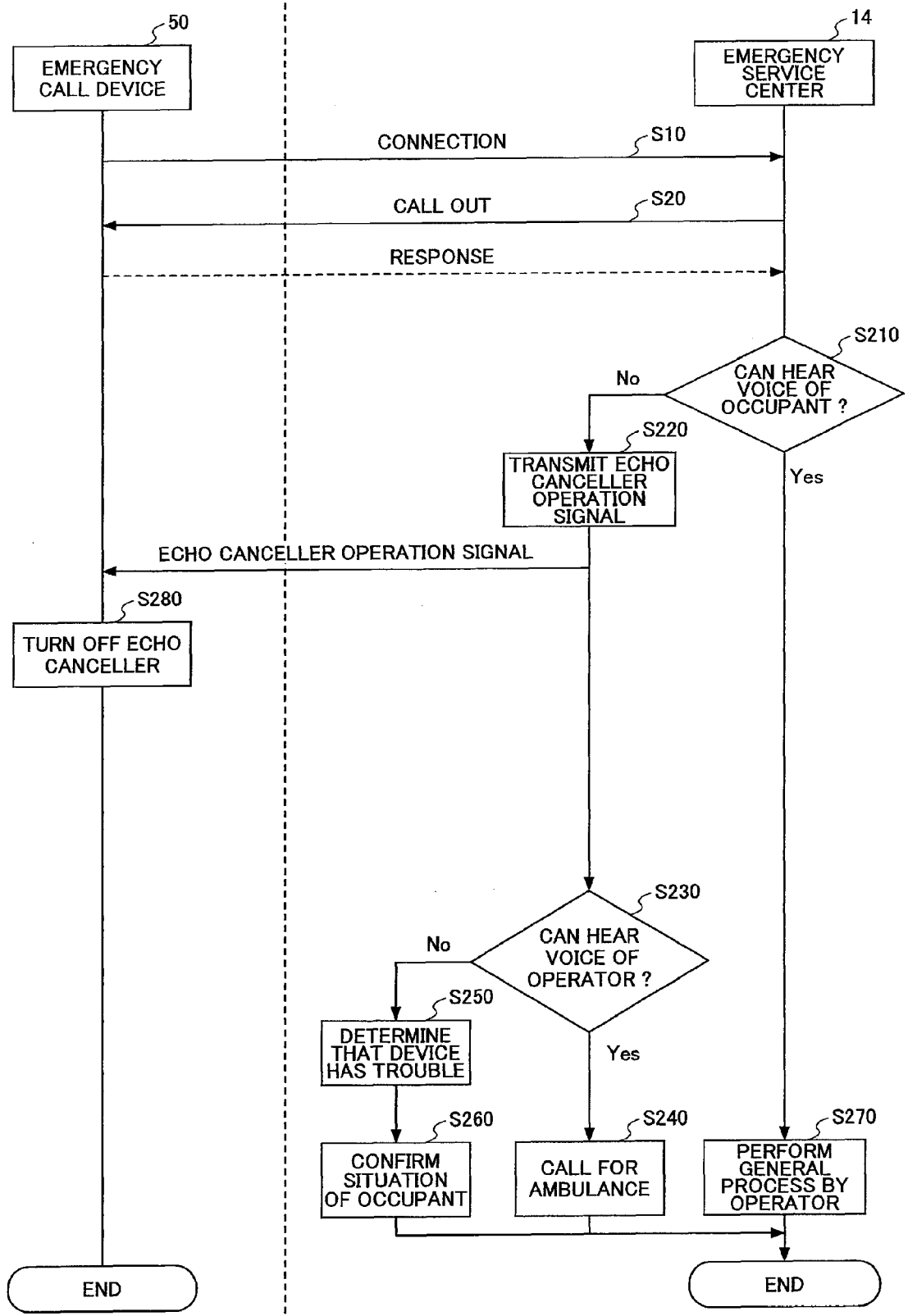
FIG. 5 is a schematic sequence diagram showing a procedure by which the center determines whether the emergency call device in communication with the center has a problem according to the second embodiment of the present invention.

FIG. 5 is a schematic sequence diagram showing a procedure by which the operator of the center 14 determines whether the emergency call device 50 in communication with the center 14 has a problem. In the procedure shown in FIG. 5, the emergency call device 50 of the vehicle 11 starts the communication with the emergency service center (center) 14 when the airbag switch 22 detects an operation of the airbag or when the communication start switch 23 is turned ON (step S10). The operator of the center 14 responds to the connection from the vehicle 11 and calls out to the occupant of the vehicle 11 (step S20).

The operator of the center 14 determines whether a voice of the occupant of the vehicle 11 as a response to the operator's call can be heard (step S210). When it is determined that the voice of the occupant of the vehicle 11 can be heard (YES in step S210), the operator of the center 14 performs a general process of calling for an ambulance and the like in accordance with the information of the damage level of the vehicle 11 and/or the injury level of the occupant of the vehicle 11 heard from the occupant of the vehicle 11 (step S270).

On the other hand, when it is determined that the occupant of the vehicle 11 does not respond to the operator's call and the voice of the occupant of the vehicle 11 cannot be heard (NO in step S210), the operator of the center 14 operates the input device 141 to cause the echo canceller operation signal transmitting section 142 to transmit the echo canceller operation signal (step S220).

When the communication device 25 of the emergency call device 50 receives the echo canceller operation signal, the echo canceller controlling section 31 in the emergency call device 50 turns OFF the echo cancelling function of the echo canceller section 29 (step S280). By doing this, the operator's voice signal included in the voice signal from the center 14 is returned to the center 14, unless the microphone 27 in the emergency call device 50 has a problem.

Next, the operator of the center 14 determines whether the operator's own voice can be heard (step S230). When it is determined that the operator's own voice can be heard (YES in step S230), it is possible that the occupant of the vehicle 11 is injured because of no response from the occupant of the vehicle 11 even in the situation where neither the speaker 26 nor the microphone 27 has a problem, and the operator of the center 14 may call for an ambulance (step S240).

On the other hand, when it is determined that the own returned voice cannot be heard (NO in step S230), it is possible that at least either the speaker 26 or the microphone 27 has a problem (step S250). Therefore, a method other than the method of communicating with the occupant of the vehicle 11 is to be used for confirming the situation of the occupant of the vehicle 11 (step S260).

According to this embodiment of the present invention, by turning OFF the echo cancelling function of the echo canceller section 29, it becomes possible to determine whether the emergency call device 50 has a problem.

Further, by turning OFF the echo canceller section 29 from the center 14, the operator may independently determine whether the emergency call device 50 has a problem. It should be noted that after adding the configuration according to this second embodiment to the configuration according to the first embodiment, the echo cancelling function of the echo canceller section 29 may be turned OFF based on the voice signal level of the transmitted voice signal and the echo canceller operation signal.

Embodiment 3

In first and second embodiments described above, it is determined whether the emergency call device 50 has a problem based on whether the operator of the center 14 can hear the operator's own voice when the echo cancelling function of the echo canceller section 29 is turned OFF. On the other hand, in this embodiment, the emergency call system 100 is described in which whether the emergency call device 50 has a problem may be determined without turning OFF the echo cancelling function of the echo canceller section 29.

When the operator of the center 14 can hear any sound from vehicle 11, the operator can determine that at least the microphone 27 of the emergency call device 50 does not have a problem. In this embodiment, as the sound, a prescribed music sound (hereinafter referred to as "BGM") output from the speaker 26 to the vehicle 11 is used. Any music may be used as the "BGM". However, it is preferable that the BGM include a range different from the voice range of the occupant of the vehicle 11 so that the operator can easily distinguish the BGM from the voice of the occupant of the vehicle 11.

Figure 6:
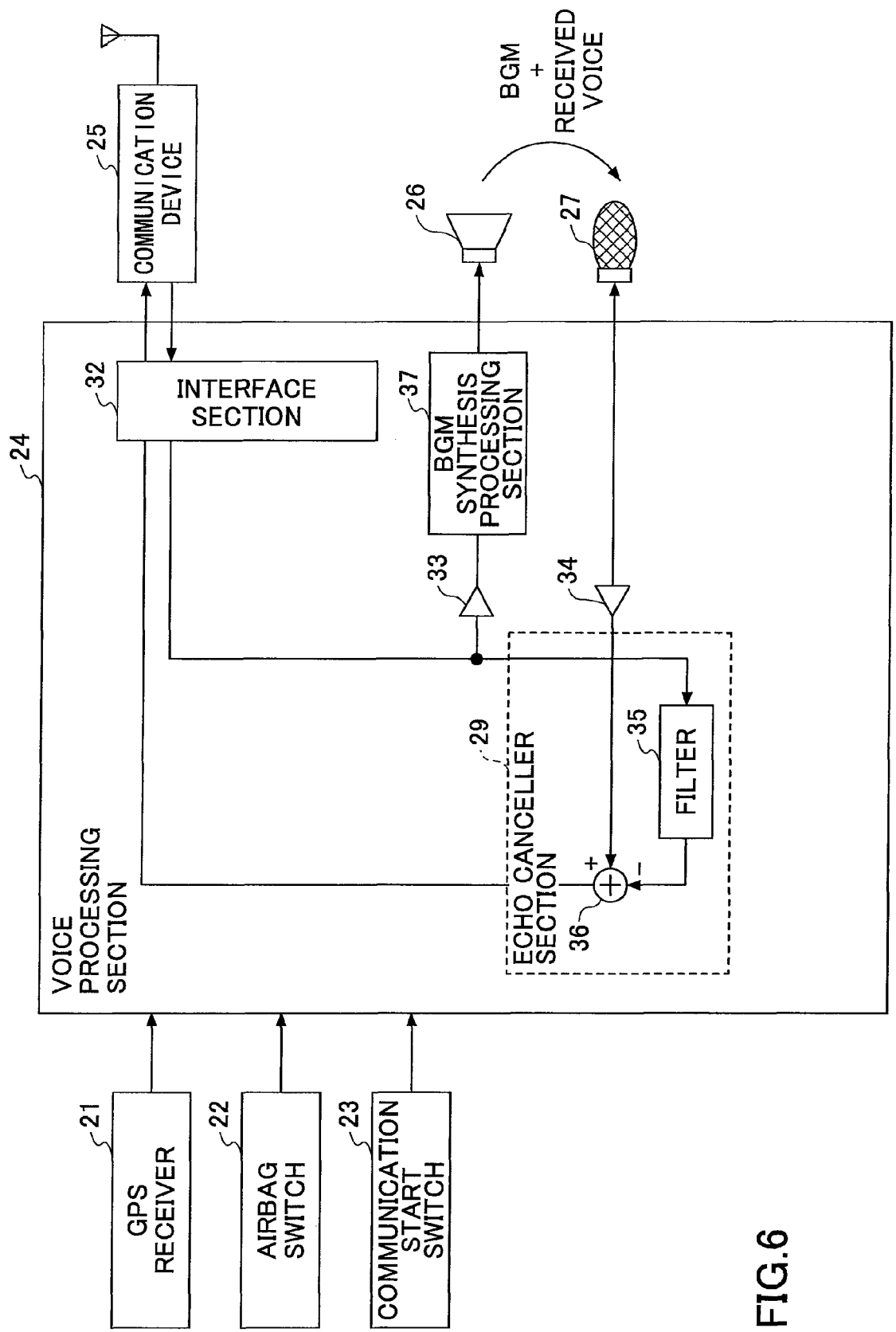
FIG. 6 is a block diagram showing an exemplary configuration of the emergency call device according to a third embodiment of the present invention.

FIG. 6 is a block diagram showing an exemplary configuration of the emergency call device 50 according to a third embodiment of the present invention. It should be noted that the same reference numerals are used in FIG. 6 for denoting the same elements in FIG. 2, and the descriptions of the same elements are omitted. As shown in FIG. 6, the emergency call device 50 includes a BGM synthesis processing section 37 and does not include the echo canceller controlling section 31 because, in this embodiment, it is not necessary to control the echo canceller section 29 to turn OFF the echo cancelling function of the echo canceller section 29.

The BGM synthesis processing section 37 combines the voice signal received by the interface section 32 with a BMG signal, and outputs the combined (synthesized) signal to the speaker 26 so that the sound of the synthesized signal is output from the speaker 26. As the BGM synthesis processing section 37, the audio device generally mounted in a vehicle as standard equipment may be used. By doing this, the cost increase may be minimized.

In this embodiment, the received voice from the operator of the center 14 and the BGM are output to the vehicle 11. However, the received voice signal is cancelled by the echo canceller section 29. Therefore, when the occupant of the vehicle 11 does not respond to the operator's call, the interface section 32 transmits only BGM to the communication device 25.

As a result, when the operator of the center 14 hears the BGM, the operator of the center 14 may determine that the microphone 27 of the emergency call device 50 does not have a problem. Further, when the occupant of the vehicle 11 responds to the operator's call, the operator of the center 14 may easily hear the voice of the occupant of the vehicle 11 which can be distinguished from the BGM because the echo cancelling function of the echo canceller section 29 is kept turned ON.

FIG. 7 is a schematic sequence diagram showing a procedure by which the operator of the center 14 determines whether the emergency call device 50 in communication with the center 14 has a problem. It should be noted that the same step numbers are used in FIG. 7 for denoting the same step numbers in FIG. 3.

In the procedure shown in FIG. 7, the emergency call device 50 of the vehicle 11 starts the communications with the emergency service center (center) 14 when the airbag switch 22 detects an operation of the airbag or when the communication start switch 23 is turned ON (step S10). The operator of the center 14 responds to the connection from the vehicle 11 and calls out to the occupant of the vehicle 11 (step S20). Then, the BGM synthesis processing section 37 in the emergency call device 50 starts a synthesis process by combining the received voice signal and the BGM signal (step S31). In this case, it should be noted that even if no voice signal is received, the synthesis process is performed by the BGM synthesis processing section 37.

The operator of the center 14 may repeatedly call out to the occupant of the vehicle 11 to determine whether a voice from the occupant of the vehicle 11 can be heard (step S60). When it is determined that the voice of the occupant of the vehicle 11 can be heard (YES in step S60), the operator of the center 14 performs a general process of calling for an ambulance and the like in accordance with the information of the damage level of the vehicle 11 and/or the injury level of the occupant of the vehicle 11 heard from the occupant of the vehicle 11 (step S90).

On the other hand, when it is determined that the occupant of the vehicle 11 does not respond to the operator of the center 14 and the voice of the occupant of the vehicle 11 cannot be heard (NO in step S60), the operator of the center 14 determines whether the BGM can be heard (step S71). When it is determined that the BGM can be heard (YES in step S71), it is possible to assume that the occupant of the vehicle 11 is injured because of no response from the occupant of the vehicle 11 even in the situation where neither the speaker 26 nor the microphone 27 has a problem, and the operator of the center 14 may call for an ambulance (step S80).

On the other hand, when it is determined that the BGM cannot be heard (NO in step S71), it is possible that at least either speaker 26 or the microphone 27 has a problem (step S110). Therefore, a method other than the method of communicating with the occupant of the vehicle 11 is to be used for confirming the situation of the occupant of the vehicle 11 (step S120).

According to this embodiment of the present invention, simply by outputting the BGM to the vehicle 11, it becomes possible to determine whether the emergency call device 50 has a problem. Therefore, the cost increase may be minimized. Further, in this embodiment, the echo cancelling function of the echo canceller section 29 is not turned OFF. Therefore, it becomes possible to hear the voice of the occupant of the vehicle 11 clearly when the occupant of the vehicle 11 responds to the operator's call.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

What is claimed is:

1. A vehicle call device comprising:
    a speaker mounted in a vehicle, the speaker outputting a received voice of an opposite communication party;
    a microphone mounted in the vehicle;
    an echo canceller unit removing the received voice that has been output from the speaker and input into the microphone;
    a detecting unit detecting an emergency situation of the vehicle; and
    a remove preventing unit preventing the echo canceller unit from removing the received voice when the detecting unit detects the emergency situation.

2. The vehicle call device according to claim 1, further comprising:
    a receiving unit receiving an preventing signal for preventing the removal of the received voice; wherein
    when the receiving unit receives the preventing signal, the remove preventing unit prevents the echo canceller unit from removing the received voice.

3. The vehicle call device according to claim 1, further comprising:
    a voice level detecting unit detecting a voice level collected by the microphone; wherein
    when the voice level detected by the voice level detection unit is less than a prescribed value, the remove preventing unit prevents the echo canceller unit from removing the received voice.

4. The vehicle call device of claim 1, further comprising:
    a sound outputting unit outputting a prescribed sound when the detecting unit detects the emergency situation.

5. A call system comprising:
    a vehicle call device;
    a telephone network; and
    a center connected with the vehicle call device through the telephone network; wherein the vehicle call device includes
        a speaker mounted in a vehicle, the speaker outputting a received voice of an opposite communication party;
        a microphone mounted in the vehicle;
        an echo canceller unit removing the received voice that has been output from the speaker and input into the microphone;
        a detecting unit detecting an emergency situation of the vehicle; and
        a remove preventing unit preventing the echo canceller unit from removing the received voice when the detecting unit detects the emergency situation; and
    the center determines whether the vehicle call device has a problem based on whether the received voice transmitted by the center is echoed back.

6. A center communicating with a vehicle call device through a telephone network, wherein
    the vehicle call device includes
        a speaker mounted in a vehicle, the speaker outputting a received voice of an opposite communication party;
        a microphone mounted in the vehicle;
        an echo canceller unit removing the received voice that has been output from the speaker and input into the microphone;
        a detecting unit detecting an emergency situation of the vehicle; and
        a remove preventing unit preventing the echo canceller unit from removing the received voice when the detecting unit detects the emergency situation; wherein
    the center determines whether the vehicle call device has a problem based on whether the received voice transmitted by the center is echoed back.

7. A calling method for a vehicle call device, the method comprising the steps of:
    outputting a received voice from a speaker mounted in a vehicle;
    removing the received voice that has been output from the speaker and input into a microphone in the vehicle;
    detecting an emergency situation of the vehicle; and
    preventing removing the received voice when the emergency situation is detected.

* * * * *